(12) United States Patent
Choi

(10) Patent No.: US 8,286,315 B2
(45) Date of Patent: Oct. 16, 2012

(54) MASS PRODUCTION TYPE POSSIBLE AUTOMATIC RHINESTONE ADHESION APPARATUS

(76) Inventor: Kwang Teak Choi, Incheon (KR)

( * ) Notice: Subject to any disclaimer, the term of this patent is extended or adjusted under 35 U.S.C. 154(b) by 580 days.

(21) Appl. No.: 12/527,991

(22) PCT Filed: Jan. 14, 2008

(86) PCT No.: PCT/KR2008/000217
§ 371 (c)(1),
(2), (4) Date: Aug. 20, 2009

(87) PCT Pub. No.: WO2008/114926
PCT Pub. Date: Sep. 25, 2008

(65) Prior Publication Data
US 2010/0043193 A1   Feb. 25, 2010

(30) Foreign Application Priority Data
Mar. 19, 2007   (KR) .................. 10-2007-0026482

(51) Int. Cl.
*B23P 5/00*   (2006.01)
*B23Q 15/00*   (2006.01)
(52) U.S. Cl. .................. 29/10; 29/714; 29/718
(58) Field of Classification Search .......... 29/10, 284, 29/559, 714, 718; 221/233
See application file for complete search history.

(56) References Cited

U.S. PATENT DOCUMENTS

| | | | | |
|---|---|---|---|---|
| 1,415,235 A | * | 5/1922 | Garnett ........................ | 29/10 |
| 2,070,737 A | * | 2/1937 | Kahan ........................ | 227/5 |
| 2,194,050 A | * | 3/1940 | Moscini ........................ | 451/184 |
| 2,944,260 A | * | 7/1960 | Effgen ........................ | 221/164 |
| 4,458,401 A | * | 7/1984 | Graham et al. ............ | 29/896.41 |
| 5,005,618 A | * | 4/1991 | Stegherr ...................... | 144/136.1 |
| 5,015,090 A | * | 5/1991 | Weisman et al. ............ | 356/30 |

FOREIGN PATENT DOCUMENTS

| | | |
|---|---|---|
| JP | 2-142502 | 5/1990 |
| KR | 10-0369300 | 1/2003 |

* cited by examiner

*Primary Examiner* — Alexander P Taosakis
(74) *Attorney, Agent, or Firm* — Seed IP Law Group PLLC

(57) ABSTRACT

Disclosed is a mass-productive automatic rhinestone attachment apparatus. More particularly, disclosed is a mass-productive automatic rhinestone attachment apparatus capable of performing mass-productive processes for the attachment of symmetrical or asymmetrical rhinestone using a predetermined pattern. The mass-productive automatic rhinestone attachment apparatus includes a rhinestone feeding device including a plurality of feeding modules constituting a plurality of sets, each feeding module being configured to retain rhinestone sorted based on the size and color thereof, a drive device to operate the rhinestone feeding device in a longitudinal direction thereof, so as to move the respective feeding modules to associated rhinestone attachment devices, a multihead-type rhinestone attachment device provided per each feeding module of the rhinestone feeding device and used to attach the same rhinestone fed from the feeding module to the same position of respective rhinestone attachment materials, a working table provided close to the bottom of the rhinestone attachment device and adapted to be moved in X-axis, Y-axis, and Z-axis directions so as to allow the rhinestone to be attached at correct coordinates depending on a desired design, and a controller to control operations of the rhinestone feeding device, drive device, rhinestone attachment device, and working table.

9 Claims, 5 Drawing Sheets

Fig. 3
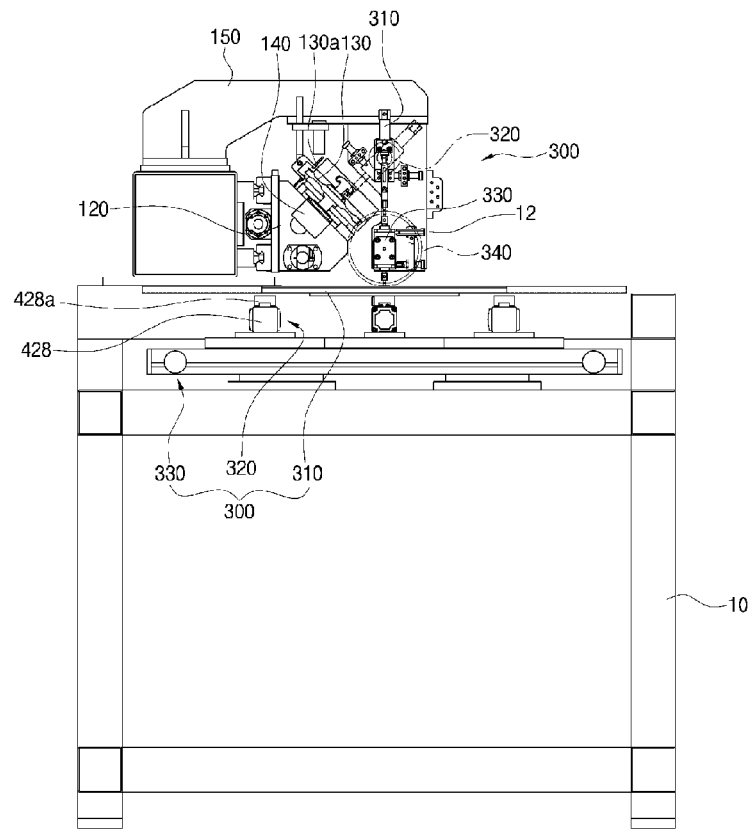
[Fig. 4]
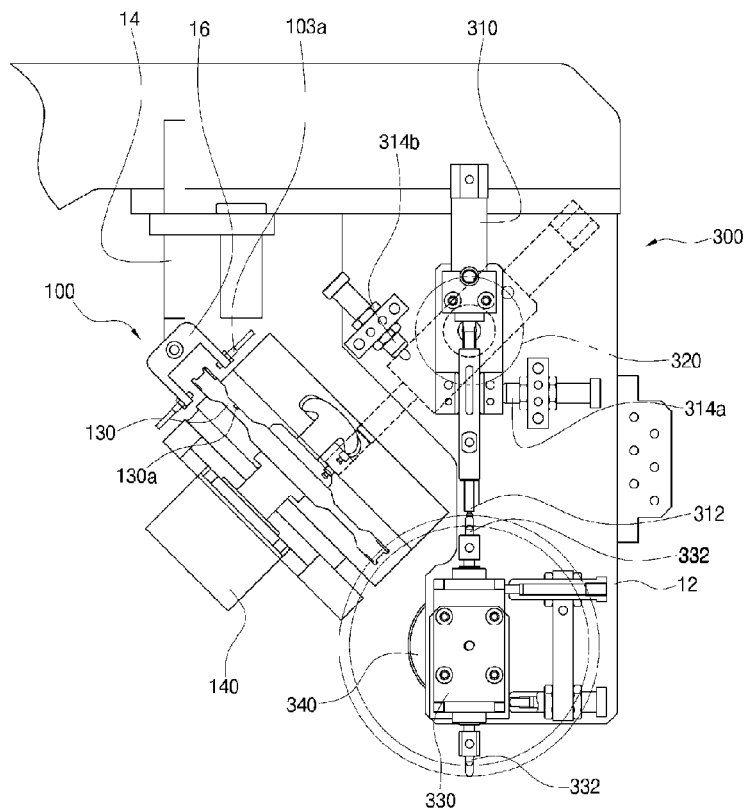

MASS PRODUCTION TYPE POSSIBLE AUTOMATIC RHINESTONE ADHESION APPARATUS

TECHNICAL FIELD

The present invention relates to a mass-productive automatic rhinestone attachment apparatus, and more particularly, to a mass-productive automatic rhinestone attachment apparatus capable of performing mass-productive processes for the attachment of symmetrical or asymmetrical rhinestone using a predetermined pattern.

BACKGROUND ART

Referring to FIG. 1 illustrating the disclosure of Korean Patent Registration No. 0369300 filed and registered by the applicant of the present invention for "Automatic Rhinestone Attachment Apparatus having a plurality of rhinestone aligners", the disclosed apparatus comprises a table transfer device 20, a rhinestone suction device 30, a rhinestone aligning device 40, a drive device 50, and a controller. The table transfer device 20 includes a work piece seating table 22 installed on a lower frame 10A, on which rhinestone to be attached will be seated, the work piece seating table 22 being installed movably in both X-axis and Y-axis directions to change an attachment position of the rhinestone. The rhinestone suction device 30 includes a supporting bracket 32 having one end mounted at a front surface of an upper frame 10B that is coupled with the lower frame 10A, a pair of rhinestone suction members 34 provided at the supporting bracket 32 to maintain a predetermined angle there between, and a position change member 36 coupled to the upper frame 10B and used to operate the respective rhinestone suction members 34 within the range of the predetermined angle. The rhinestone aligning device 40 includes a pair of rotation supporting members 41 vertically extending downward from the upper frame 10B at opposite sides of the rhinestone suction device 30, a rotating member 44 provided at each of the rotatable supporting members 41, and a plurality of rhinestone aligning members 42 coupled to the rotating member 44 by means of shafts 43. The drive device 50 includes a revolution drive member 52 provided at each rotation supporting member 41 to operate the associated rotating member 44, and a rotation drive member 54 installed at a lower end of the rotation supporting member 41 to operate the rhinestone aligning members 42 after the rhinestone aligning members 42 are moved to set points by operation of the revolution drive member 52. The controller includes a rotating-member position detecting sensor 62 to sense a rotating angle of the associated rotating member 44 when the rotating member 44 is rotated by the revolution drive member 52, and an aligning-member position detecting sensor 64 to sense a position of the associated rhinestone aligning member 42. The controller is used to control the table transfer device 20, rhinestone suction device 30, and drive device 50 based on data inputted thereto.

In the above described conventional automatic rhinestone attachment apparatus, to deal with various kinds of rhinestone having different sizes and shapes from one another for mass production, it is necessary to provide a plurality of rhinestone aligning devices 40. This results in increased installation costs and consequently, high product price. Further, since the conventional apparatus needs an air supply line for use with the rhinestone aligning members 42 and the rhinestone suction members 34, which utilize pneumatically-rotated cylinders, the resultant apparatus has problems of complex configuration and unwanted centrifugal separation of large-size rhinestone. Yet another problem of the above described conventional apparatus is that it always makes only a constant directional pattern when using symmetrical rhinestone.

DISCLOSURE OF INVENTION

Technical Problem

Therefore, the present invention has been made in view of the above problems, and it is an object of the present invention to provide a mass-productive automatic rhinestone attachment apparatus, which enables the patterning of both symmetrical and asymmetrical rhinestone, and can achieve a high attachment rate with the use of a plurality of sets of rhinestone feeding modules and a plurality of rhinestone attachment devices, thereby enabling mass production with enhanced productivity and achieving low installation costs and product price, and also, can achieve simplified overall configuration having no air supply line by virtue of the provision of a controllable motor.

Technical Solution

In accordance with the present invention, the above and other objects can be accomplished by the provision of a mass productive automatic rhinestone attachment apparatus comprising: a rhinestone feeding device including a plurality of feeding modules constituting a plurality of sets, each feeding module being configured to retain rhinestone sorted based on the size and color thereof; a drive device to operate the rhinestone feeding device in a longitudinal direction thereof, so as to move the respective feeding modules to associated rhinestone attachment devices; a multihead-type rhinestone attachment device provided per each feeding module of the rhinestone feeding device and used to attach the same rhinestone fed from the feeding module to the same position of respective rhinestone attachment materials; a working table provided close to the bottom of the rhinestone attachment device and adapted to be moved in X-axis, Y-axis, and Z-axis directions so as to allow the rhinestone to be attached at correct coordinates depending on a desired design; and a controller to control operations of the rhinestone feeding device, drive device, rhinestone attachment device, and working table. This configuration is advantageous to perform a mass productive attachment process for rhinestone.

Advantageous Effects

With a mass productive automatic rhinestone attachment apparatus according to the present invention, there are several advantageous effects as follows. Firstly, the present invention enables the patterning of both symmetrical and asymmetrical rhinestone. Secondly, with the use of a plurality of sets of rhinestone feeding modules and a plurality of rhinestone attachment devices, an attachment process for rhinestone can be performed with a high rate. This has the effect of achieving mass production with enhanced productivity, and consequently, reducing installation costs and product price. Thirdly, the adoption of a controllable motor has the effect of eliminating an air supply line, and the resultant apparatus can achieve simplified overall configuration.

BRIEF DESCRIPTION OF THE DRAWINGS

The above and other objects, features, and other advantages of the present invention will be more clearly understood from the following detailed description taken in conjunction with the accompanying drawings, in which:

FIG. 3 is a side view of the mass productive automatic rhinestone attachment apparatus;

FIG. 4 is a side view illustrating a rhinestone feeding device and rhinestone attachment device included in the mass productive automatic rhinestone attachment apparatus;

MODE FOR THE INVENTION

Hereinafter, a mass productive automatic rhinestone attachment apparatus according to an embodiment of the present invention will be described with reference to the accompanying drawings.

Figure 1:
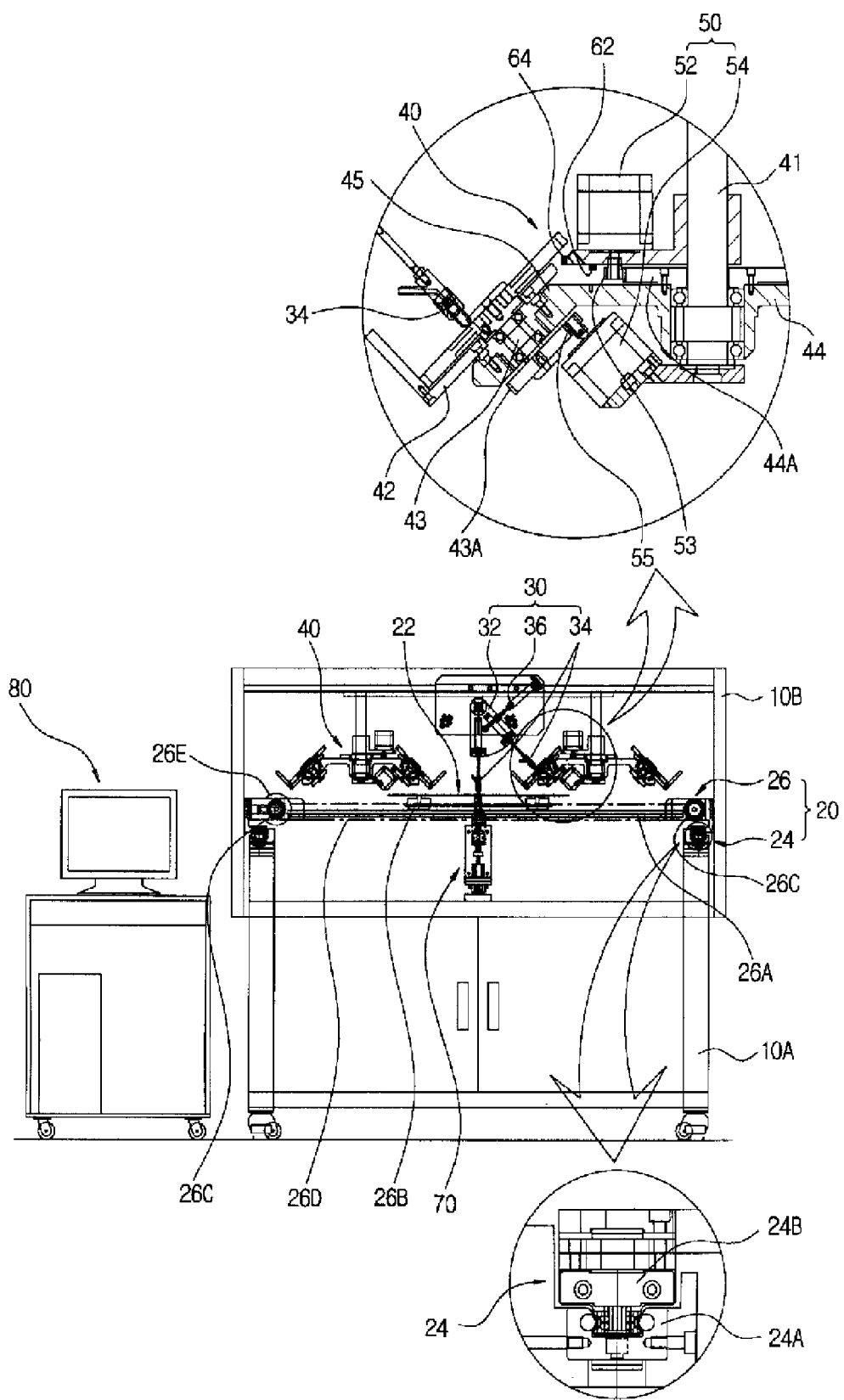
FIG. 1 is a front view illustrating a conventional automatic rhinestone attachment apparatus.
Figure 2:
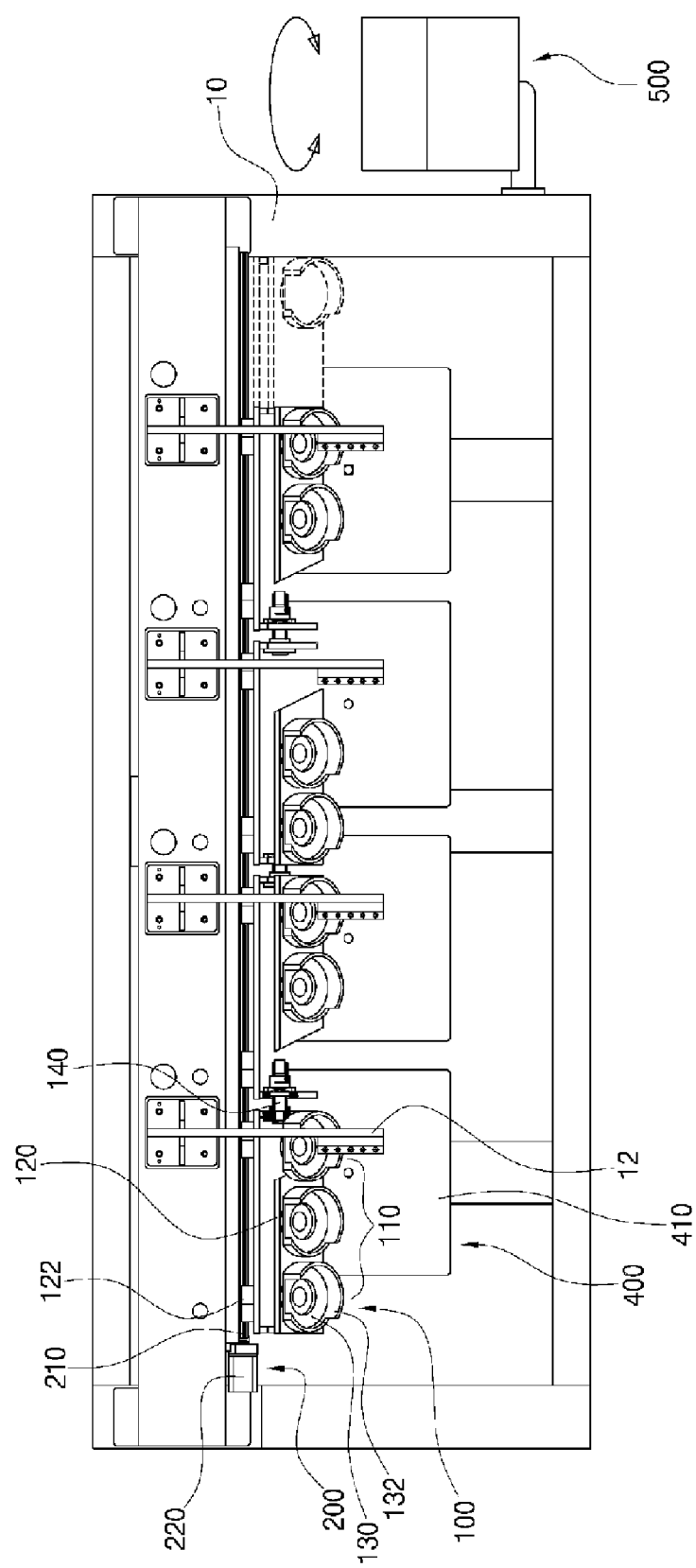
FIG. 2 is a plan view illustrating a mass productive automatic rhinestone attachment apparatus according to an embodiment of the present invention.

The mass productive automatic rhinestone attachment apparatus according to an embodiment of the present invention, as shown in FIGS. 2 and 3, includes a frame 10, a rhinestone feeding device 100, a drive device 200, a plurality of rhinestone attachment devices 300, a plurality of working tables 400, and a controller 500.

The frame 10 is configured to support all constituent elements of the attachment apparatus including, for example, the rhinestone feeding device 100, drive device 200, rhinestone attachment devices 300, working tables 400, and controller 500. The frame 10 may be provided at every corner of a lower surface thereof with wheels (not shown).

The frame 10 is also provided, at an upper surface thereof, with a plurality of bases 12. The bases 12 are arranged by a predetermined interval 12 along a rear end of the upper surface of the frame 10, such that the rhinestone attachment devices 300, which will be described hereinafter, are mounted to the bases 12, respectively.

The rhinestone feeding device 100, as shown in FIGS. 2 to 4 and FIG. 6, includes a plurality of sets of one or more feeding modules 110, which are intended to retain different kinds of rhinestone sorted based on the color and size thereof. That is, each feeding module 110 can feed a specific kind of rhinestone to the associated rhinestone attachment device 300. The feeding modules 110 are aligned in a horizontal line, and neighboring sets of the feeding modules 110 are spaced apart from each other by a pre-determined distance while being connected by means of connecting members 140.

More specifically, each of the feeding modules 110 includes at least one rotating member 130, rotating-angle sensor 103a, peripheral member 132, and rotating-member drive motor 140. Although an illustrative embodiment of the present invention describes that the feeding module 110 may include three rotating members 130 and a set of the feeding modules 110 include four feeding modules 110, the number of the rotating members 130 and consequently, the number of the feeding modules 110 can increase or decrease.

The rotating members 130 have a circular disk shape. Each of the rotating member 130 is radially formed, along the circumferential edge of an upper surface thereof, with a plurality of feeding recesses 130a, to sequentially feed symmetrical rhinestone received in the respective feeding recesses 130a one by one during rotation of the rotating member 130. The rotating member 130 is obliquely installed at an inclined front surface of a fixing plate 120.

Alternatively, although not shown in the drawings, the rotating members 130 may be replaced by a plurality of different rotating members 130 having different shapes of feeding recesses 130a arranged by a predetermined interval, to sequentially feed asymmetrical rhinestone as well as symmetrical rhinestone one by one.

As an example for the smooth alignment of asymmetrical rhinestone, most the feeding recesses 130a of the rotating member 130 are configured to correspond to the asymmetrical rhinestone except for standard ones, which have V-shaped guiding planes and are arranged by a predetermined interval.

The fixing plate 120 has a plurality of screw nuts 122 secured to a rear surface thereof. The screw nuts 122 are configured to be fastened to a screw 210 of the drive device 200, which will be described hereinafter, for the transmission of power generated by rotations of the screw 210.

The rotating-angle sensor 103a is provided at a rear end of each rotating member 130 and adapted to sense a rotating angle of the rotating member 130. To allow rhinestone suction members 310 of the associated rhinestone attachment device 300 to suction rhinestone when the feeding recesses 130a of the rotating member 130 coincide with a rhinestone feeding position, the rotating-angle sensor 103a sends a signal indicative of the coincidence to the controller 500, which will be described hereinafter, and also receives a control signal from the controller 500.

More specifically, each rotating-angle sensor 103a, which is provided at each rotating member 130, is secured to the associated base 12 by means of a sensor securing shaft 14 and an angle-adjustable sensor fixture 16 provided at a lower end of the sensor securing shaft 14.

The peripheral member 132 is configured to enclose the associated rotating member 130 therein and to have a height higher than that of the rotating member 130 in order to prevent the discharge of rhinestone contained therein.

The rotating member drive motor 140 provides the associated rotating member 130 with a drive force upon receiving electric power applied thereto. That is, the rotating member drive motor 140 rotates the rotating member 130, to move the feeding recesses 130a of the rotating member 130 to the rhinestone feeding position.

Additionally, a cover 150 is provided above each base 12 to enclose the associated rhinestone attachment device 300, which will be described hereinafter.

Figure 6:
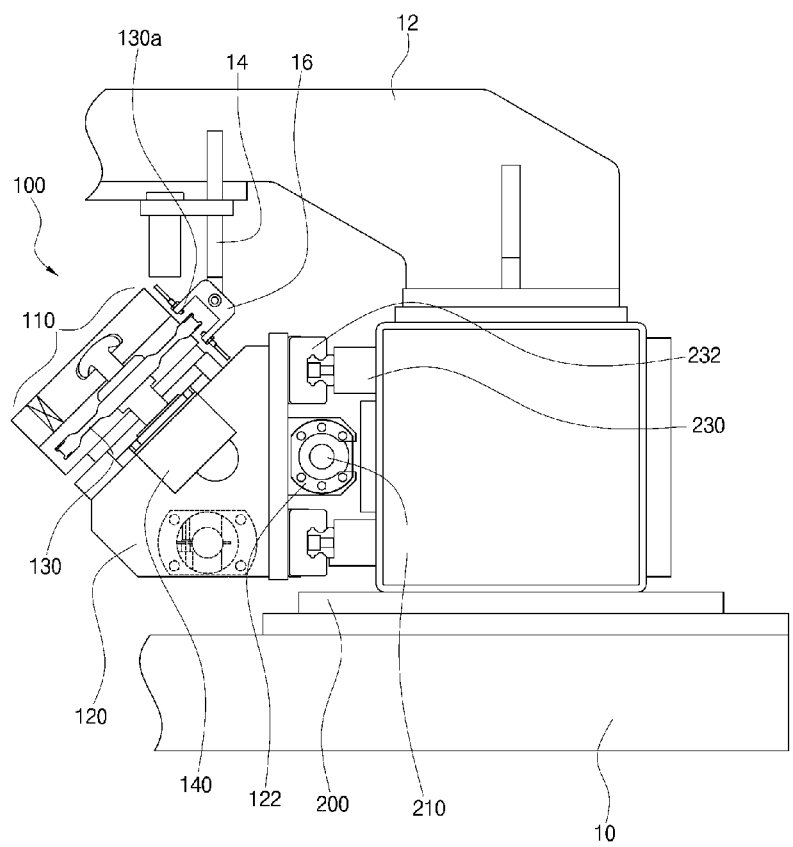
FIG. 6 is a side view illustrating a rhinestone feeding device and drive device included in the mass productive automatic rhinestone attachment apparatus.

The drive device 200, as shown in FIGS. 2, 3, and 6, serves to longitudinally move all the feeding modules 110 of the rhinestone feeding device 100 using electric power applied thereto, so as to move the feeding modules 110 toward the respective rhinestone attachment devices 300. The drive device 200 includes, in addition to the screw 210, a screw drive motor 220, a pair of linear guides 230, and a pair of linear guide blocks 232.

The screw 210 is fastened with the screw nuts 122 provided at the rear surface of the fixing plate 120, to move the plurality of sets of the feeding modules 110 of the rhinestone feeding device 100 to their respective working positions. Both ends of the screw 210 are coupled to the frame 10 to keep the screw 210 in a horizontal orientation.

The screw drive motor 220 is coupled to one end of the screw 210, to provide the screw 210 with a rotating force upon receiving electric power applied thereto. Here, the screw drive motor 220 determines revolutions per minute of the screw 210 in response to a signal transmitted from the controller 500, to control a movement speed of the rhinestone feeding device 100.

The pair of linear guides 230 include upper and lower linear guides 230 attached to a front surface of the associated base 12, and in turn, the pair of linear guide blocks 232 are movably joined with the respective linear guides 230 while being attached to the rear surface of the fixing plate 120.

Figure 5:
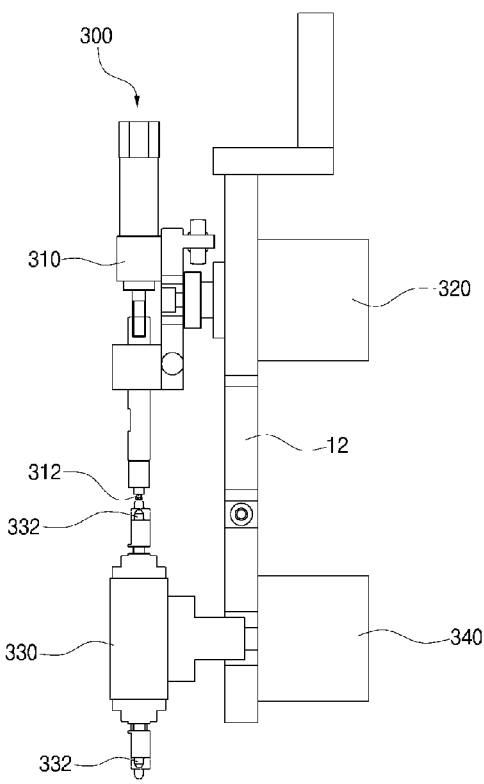
FIG. 5 is a front view of FIG. 4.

The rhinestone attachment devices 300, as shown in FIGS. 3 to 5, are of multi-head type such that they are allotted, respectively, to the feeding modules 110 of the rhinestone feeding device 100. Each of the rhinestone attachment devices 300 is mounted to the associated base 12, and serves to attach the same kind of rhinestone, fed from the associated feeding module 110, to the same position of sequentially-fed rhinestone attachment materials seated on moving plates 410 of the associated working table 400, which will be described hereinafter. Each of the rhinestone attachment devices 300 includes a rhinestone suction member 310, a first drive motor 320, a rhinestone delivery/attachment member 330, and a second drive motor 340.

The rhinestone suction member 310 is rotatable by a predetermined angle such that it can suction rhinestone received in the feeding recesses 130a of the associated feeding module 110 at the rhinestone feeding position and deliver the suctioned rhinestone to a desired delivery position, i.e. to a nozzle 332 of the rhinestone delivery/attachment member 330.

The rhinestone suction member 310 has a quick exhaust valve (not shown) installed at a pneumatic unit thereof, to enhance the forward/rearward movement speed of an actuating cylinder included in the rhinestone suction member 310. On the basis of a program stored in the controller 500, the vacuum suction/vacuum removal speed of the rhinestone suction member 310 can be controlled.

Here, a pair of stoppers 314a and 314b are provided at a side surface of each base 12 at front and rear sides of the rhinestone suction member 310, to restrict a movement position of the rhinestone suction member 310 by setting a rhinestone feeding position and a rhinestone delivery position of the rhinestone suction member 310.

The stoppers 314a and 314b can be controlled in position by an operator.

The rhinestone suction member 310 has a suction nozzle 312 provided at a lower end thereof. The suction nozzle 312 is connected with an air supply line (not shown) to provide the rhinestone suction member 310 with a suction force required to suction rhinestone from the feeding recesses 130a. A rotating angle of the rhinestone suction member 310 is controlled by the first drive motor 320.

The first drive motor 320 provides the rhinestone suction member 310 with a drive force upon receiving electric power applied thereto. Revolutions per minute of the first drive motor 320 are controlled by the controller 500, such that the first drive motor 320 is rotated at a low speed to prevent unwanted centrifugal separation of rhinestone upon attachment of a relatively large size of rhinestone, and conversely, is rotated at a high speed upon attachment of a relatively small size of rhinestone.

The first drive motor 320 may be any one suitable to be controlled in revolutions per minute thereof by the controller 500, such as a stepping motor, servo motor, or the like.

The rhinestone delivery/attachment member 330 is mounted to the base 12 at a position below the rhinestone suction member 310. Once the rhinestone suction member 310 reaches a rhinestone delivery position, the rhinestone delivery/attachment member 330 is rotated by 180 degrees to a rhinestone attachment position for attaching rhinestone to the rhinestone attachment material seated on the associated moving plate 410 of the working table 400.

More specifically, the rhinestone delivery/attachment member 330 has a pair of nozzles 332 provided at both ends thereof, respectively. The pair of nozzles 332 are raised or lowered, respectively, by drive means (not shown) such that they are spaced apart from each other by a distance corresponding to a set distance between the suction nozzle 312 of the rhinestone suction member 310 and the moving plate 410.

The rhinestone delivery/attachment member 330 may be provided with stopper(s) to limit a rotating position thereof.

The second drive motor 340 provides the rhinestone delivery/attachment member 320 with a drive force upon receiving electric power applied thereto. Revolutions per minute of the second drive motor 340 are controlled by the controller 500, such that the second drive motor 340 is rotated at a low speed to prevent unwanted centrifugal separation of rhinestone upon attachment of a relatively large size of rhinestone, and conversely, is rotated at a high speed upon attachment of a relatively small size of rhinestone.

The second drive motor 340 may be any one suitable to be controlled in revolutions per minute thereof by the controller 500, such as a stepping motor, or the like.

Figure 7:
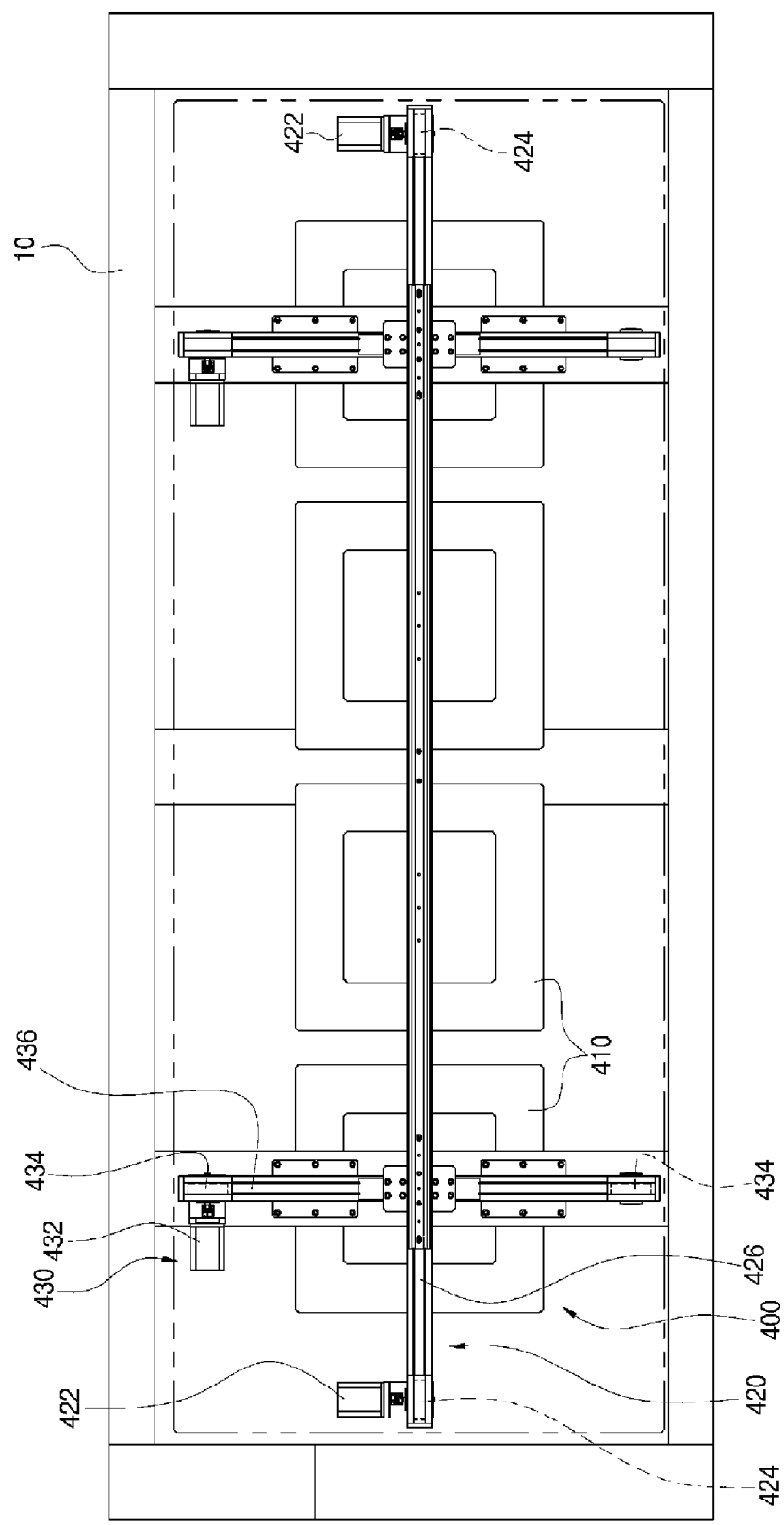
FIG. 7 is a plan view illustrating a working table for the mass productive automatic rhinestone attachment apparatus.

The working tables 400, as shown in FIG. 7, are provided below the respective rhinestone attachment devices 300 at positions close to the respective rhinestone delivery/attachment members 330. Each of the working tables 400 is configured to be rotated and moved in X-axis, Y-axis, and Z-axis directions, to allow rhinestone to be attached at correct coordinates depending on a desired design. The working table 400 includes a plurality of moving plates 410, a X-axis directional mover 420, Y-axis directional movers 430, and Z-directional rotors 440.

The moving plates 410 are provided below the rhinestone delivery/attachment members 330, respectively, and each bears the rhinestone attachment material at an upper surface thereof.

The X-directional mover 420 is provided at the bottom of the moving plates 410, to move the moving plates 410 in a X-axis direction. A pair of linear guides 428 are provided at opposite sides of the X-axis directional mover 420, and in turn, a pair of linear guide blocks 428a are provided on the respective linear guides 428.

The X-axis directional mover 420 is provided at both ends thereof with drive motors 422 each having a drive shaft formed with a spline 424. A belt 426 is connected with the splines 424 of both the drive motors 422. The moving plates 410 are fixed at an upper surface of the belt 426 and spaced apart from one another by the same distance as that of the neighboring rhinestone attachment devices 300.

The Y-axis directional movers 430 are provided at both end positions of a lower surface of the X-directional mover 420 such that they extend perpendicular to the X-axis directional mover 420, to move the moving plates 410 in a Y-axis direction. Although not shown, a pair of linear guides are provided at opposite sides of each Y-axis directional mover, and in turn, a pair of linear guide blocks are provided on the respective linear guides.

Each of the Y-axis directional movers 430 includes a drive motor 432 provided at one end thereof, a pair of splines 434 spaced apart from a drive shaft of the drive motor 432, and a belt 436 to connect the splines 434 with each other. The X-axis directional mover 420 is located at an upper surface of the belt 436, to move the X-axis directional mover 430 in a Y-axis direction.

The Z-axis directional rotors 440 are provided to achieve a desired directional pattern of asymmetrical rhinestone having, for example, rectangular, star and heart shapes, rather than symmetrical rhinestone, based on a desired direction and design when the asymmetric rhinestone is attached to the rhinestone attachment material. As the moving plates 410 are rotated by the Z-axis directional rotors 440, the asymmetrical rhinestone can be attached in a different direction from the rhinestone feeding direction even when the rhinestone feeding device 100 and the rhinestone attachment devices 300 feed asymmetrical rhinestone in the same manner as symmetrical rhinestone.

The Z-axis directional rotor 440 also may be any one suitable to be controlled in revolutions per minute and rotating angle thereof by the controller 500, such as a stepping motor, servo motor, or the like.

In the present invention, since the Z-axis directional rotors 440 can be controlled individually, the respective working tables 400 can achieve a variety of patterns when using asymmetrical rhinestone. Further, when using symmetrical rhinestone, the Z-axis directional rotors 440 can be stopped in operation, allowing the general use of the apparatus according to the present invention.

The controller 500, as shown in FIG. 2, is provided at a side surface of the frame 10, and used to control the rotating speed of the rotating members 130 of the rhinestone feeding device 100, the revolutions per minute of the drive device 200, the revolutions per minute of the first and second drive motors 320 and 340 used to operate the rhinestone suction members 310 and rhinestone delivery/attachment members 330 of the rhinestone attachment devices 300, the rotating angle of the Z-axis directional rotors 440, and the movement speed of the working tables 400. In particular, by controlling the revolutions per minute of the first and second drive motors 320 and 340 and the rotating angle of the Z-axis directional rotors 440, the controller 500 can prevent unwanted centrifugal separation of rhinestone from the rotating rhinestone suction members 310 and rhinestone delivery/attachment members 330 upon delivery of relatively large-size rhinestone, and also, can achieve a desired pattern by differentiating attachment directions of rhinestone even under the same feeding direction of asymmetrical rhinestone.

With the above described configuration, the mass productive automatic rhinestone attachment apparatus according to the present invention has the following operation and effects. As shown in FIGS. 2 to 7, first, on the basis of desired coordinates depending on a preset design as designated by the controller 500, the rhinestone attachment materials are seated and fixed on the respective moving plates 410.

Next, rhinestone sorted based on specific color and size thereof is sequentially fed to all the feeding modules 110 in the same manner as one another.

Subsequently, the rotating members 130 of the feeding modules 110 are rotated by the rotating-member drive motors 140, to allow the rhinestone to be inserted into the respective feeding recesses 130a of the rotating members 130. If the rotating members 130 reach rhinestone feeding positions, respectively, by rotations thereof, the rhinestone suction members 310 of the rhinestone attachment devices 300 are moved to the rhinestone feeding positions, to pneumatically suction the rhinestone by the suction nozzles 312.

After suctioning the rhinestone by the suction nozzles 312 thereof, the rhinestone suction members 310 are returned to their original positions by operation of the first drive motors 320. Then, one nozzle 332 of each rhinestone delivery/attachment member 330 is raised up to the height of rhinestone so as to pneumatically suction the rhinestone. As the rhinestone delivery/attachment members 330 are rotated by 180 degrees, the rhinestone can be attached to the rhinestone attachment materials seated on the respective moving plates 410, to have the same pattern as one another.

In this case, the other nozzle 332 of each rhinestone delivery/attachment member 330, except for the nozzle 332 used to attach the rhinestone to the rhinestone attachment material, cooperates with the rhinestone suction member 310, to keep the rhinestone suctioned by the rhinestone suction member 310 in a ready state prior to being attached.

Here, the controller 500 stores data of rotating speeds depending on the sizes and weights of rhinestone be to be attached. Thereby, on the basis of preset values therein, the controller 500 can decrease the revolutions per minute of the first and second drive motors 320 and 340 upon attachment of heavy-weight rhinestone, and conversely, increase the revolutions per minute of the first and second drive motors 320 and 340 upon attachment of light-weight rhinestone.

To attach different colors and sizes of rhinestone, the drive device 200 is operated to move the required feeding modules 110 to desired working positions of the rhinestone attachment devices 300, and then, to perform the same rhinestone attachment operation as the above description.

Meanwhile, when it is desired to attach asymmetrical rhinestone rather than the symmetrical rhinestone as described above, the rotating members 130 are replaced by ones having the feeding recesses 130 corresponding to the asymmetrical rhinestone.

Next, the asymmetrical rhinestone is fed into the rhinestone feeding device 100 after being sorted depending on the size and color thereof. As the rotating members 130 are rotated, the asymmetrical rhinestone can be seated in a predetermined direction by the guiding planes of the feeding recesses 130a to thereby be loaded in the feeding recesses 130a.

Subsequently, in the same method as the symmetrical rhinestone, if the rotating members 130, in which the respective feeding recesses 130a contain the rhinestone, reach rhinestone feeding positions, respectively, by rotations thereof, the rhinestone suction members 310 of the rhinestone attachment devices 300 are moved to the rhinestone feeding positions, to pneumatically suction the rhinestone by use of the suction nozzles 312.

After suctioning the rhinestone by the suction nozzles 312 thereof, the rhinestone suction members 310 are returned to their original positions by operation of the first drive motors 320. Then, one nozzle 332 of each rhinestone delivery/attachment member 330 is raised up to the height of rhinestone so as to pneumatically suction the rhinestone. As the rhinestone delivery/attachment members 330 are rotated by 180 degrees, the rhinestone can be attached to the rhinestone attachment materials seated on the respective moving plates 410, to have the same pattern as one another.

In this case, the moving plates 410 of the working tables 400 can be individually or wholly moved and rotated by the X-axis and Y-axis directional movers 420 and 430 and the Z-axis directional rotors 440. As the moving plates 410 are rotated by a pre-determined angle under the control of the controller 500, the asymmetrical rhinestone can be patterned in a different direction from the rhinestone feeding direction.

To attach different colors and sizes of rhinestone, the drive device 200 is operated to move the required feeding modules 110 to desired working positions of the rhinestone attachment devices 300, and then, to perform the same rhinestone attachment operation as the above description.

Meanwhile, the Z-axis rotation of the moving plates 410 and the alignment of asymmetrical rhinestone are also applicable to applications that the feeding modules 110 and rhinestone attachment devices 300 constitute a plurality of sets, that the rotating members of the feeding module are arranged radially, and that the rhinestone attachment device and the rhinestone feeding device constitute a single independent set.

Although the preferred embodiment of the present invention has been disclosed for illustrative purposes, those skilled in the art will appreciate that various modifications, additions and substitutions are possible, without departing from the scope and spirit of the invention as disclosed in the accompanying drawings.

The invention claimed is:

1. A mass productive automatic rhinestone attachment apparatus comprising:
    a rhinestone feeding device including a plurality of feeding modules constituting a plurality of sets and arranged in a straight line by a predetermined interval, each feeding module being configured to retain rhinestone sorted based on the size and color thereof, and each feeding module including
        one or more rotating members obliquely installed in a line and each having a plurality of feeding recesses radially formed along the circumferential edge of an upper surface thereof to sequentially feed the rhinestone received in the feeding recesses one by one during rotations of the rotating members;
        a rotating-member drive motor provided at each rotating member to rotate the rotating member, so as to allow the feeding recesses to be moved to a rhinestone feeding position; and
        a rotating-angle sensor to sense a rotating angle of each rotating member, so as to coincide the feeding recesses with the rhinestone feeding position;
    a drive device to operate the rhinestone feeding device in a longitudinal direction thereof, so as to move the respective feeding modules to associated rhinestone attachment devices;
    a multihead-type rhinestone attachment device provided per each feeding module of the rhinestone feeding device and used to attach the same rhinestone fed from the feeding module to the same position of respective rhinestone attachment materials;
    a working table provided close to the bottom of the rhinestone attachment device and adapted to be moved in X-axis, Y-axis, and Z-axis directions so as to allow the rhinestone to be attached at correct coordinates depending on a desired design; and
    a controller to control operations of the rhinestone feeding device, drive device, rhinestone attachment device, and working table.

2. The apparatus according to claim 1, wherein the shape of the feeding recesses of at least one of the rotating members has guiding planes to retain asymmetric rhinestone as well as symmetric rhinestone.

3. The apparatus according to claim 1, wherein the drive device comprises:
    a screw to which screw nuts provided at a rear surface of a rotating-member fixing plate are fastened to move each feeding module of the rhinestone feeding device to a working position, both ends of the screw being kept at fixed positions; and
    a screw drive motor coupled to one end of the screw so as to provide the screw with a rotating force.

4. The apparatus according to claim 3, wherein the rhinestone attachment device comprises:
    a rhinestone suction member to be rotated from the rhinestone feeding position of the feeding module to a rhinestone delivery position for delivering the rhinestone suctioned thereby;
    a rhinestone delivery/attachment member located below the rhinestone suction member and adapted to be rotated by 180 degrees from the rhinestone delivery position to a rhinestone attachment position on the rhinestone attachment material disposed on the working table; and
    first and second drive motors coupled to a rear end of a base to provide the rhinestone suction member and rhinestone delivery/attachment member with a drive force.

5. The apparatus according to claim 4, wherein the rhinestone delivery/attachment member comprises nozzles provided at both ends thereof and the nozzles are adapted to be raised and lowered by a set distance.

6. The apparatus according to claim 5, wherein the working table comprises:
    a moving plate provided close to the bottom of the rhinestone delivery/attachment member and having an upper surface on which the rhinestone attachment material is seated;
    a Z-axis directional rotor provided at a lower surface of the moving plate, to rotate the moving plate in a Z-axis direction;
    a X-axis directional mover provided at a lower surface of the Z-axis directional rotor, to move the moving plate in a X-axis direction; and
    a Y-axis directional mover provided at a lower surface of the X-axis directional mover perpendicular to thereto, to move the moving plate in a Y-axis direction.

7. The apparatus according to claim 5, wherein each of the first and second drive motors and Z-axis directional rotor is any one of a stepping motor or a servo motor.

8. The apparatus according to claim 7, wherein the X-axis and Y-axis directional movers are operated, respectively, by drive motors and belts.

9. The apparatus according to claim 8, wherein the controller controls revolutions per minute of the first and second drive motors and Z-axis directional rotor according to the size of rhinestone.

* * * * *